United States Patent
Mayer et al.

(10) Patent No.: US 6,920,786 B2
(45) Date of Patent: Jul. 26, 2005

(54) FLOW DETECTOR WITH LEAD-THROUGHS AND METHOD FOR ITS PRODUCTION

(75) Inventors: Felix Mayer, Zürich (CH); Mark Hornung, Zürich (CH); Moritz Lechner, Zürich (CH); Jens Kubasch, Zürich (CH)

(73) Assignee: Sensirion AG, Zurich (CH)

( * ) Notice: Subject to any disclaimer, the term of this patent is extended or adjusted under 35 U.S.C. 154(b) by 0 days.

(21) Appl. No.: 10/646,510

(22) Filed: Aug. 21, 2003

(65) Prior Publication Data

US 2004/0118218 A1 Jun. 24, 2004

(30) Foreign Application Priority Data

Aug. 27, 2002 (CH) .............................. 1465/02

(51) Int. Cl.[7] .............................................. G01F 1/68
(52) U.S. Cl. .................................................. 73/204.22
(58) Field of Search ......................... 73/204.22, 204.26

(56) References Cited

U.S. PATENT DOCUMENTS

| | | | |
|---|---|---|---|
| 4,548,078 A | 10/1985 | Bohrer et al. ................ | 73/204 |
| 4,677,850 A | 7/1987 | Miura et al. .................. | 73/204 |
| 4,829,818 A | 5/1989 | Bohrer ...................... | 73/204.22 |
| 5,396,795 A | 3/1995 | Araki ....................... | 73/204.26 |
| 5,404,753 A | 4/1995 | Hecht et al. ............... | 73/204.22 |
| 6,032,527 A | 3/2000 | Genova et al. ............. | 73/204.26 |
| 6,176,131 B1 * | 1/2001 | Hecht et al. ............... | 73/204.26 |
| 6,729,181 B2 | 4/2002 | Mayer et al. .............. | 73/204.22 |

FOREIGN PATENT DOCUMENTS

| | | |
|---|---|---|
| EP | 0974817 A1 | 1/2000 |
| EP | 1035406 A1 | 9/2000 |
| EP | 1182432 A2 | 2/2002 |

* cited by examiner

*Primary Examiner*—Harshad Patel
(74) *Attorney, Agent, or Firm*—Donald S. Dowden; Cooper & Dunham LLP

(57) ABSTRACT

A flow detector comprises at least two housing parts with a semiconductor chip having an integrated flow sensor arranged between the housing parts. An opening is provided in one of the housing parts and at least one metal pin extends through the opening and forms an electrical lead-through. A hardened filler material is used for sealing the lead-through against the walls of the opening. This construction provides a well sealed cavity for the fluid to be measured and can be manufactured easily.

15 Claims, 1 Drawing Sheet

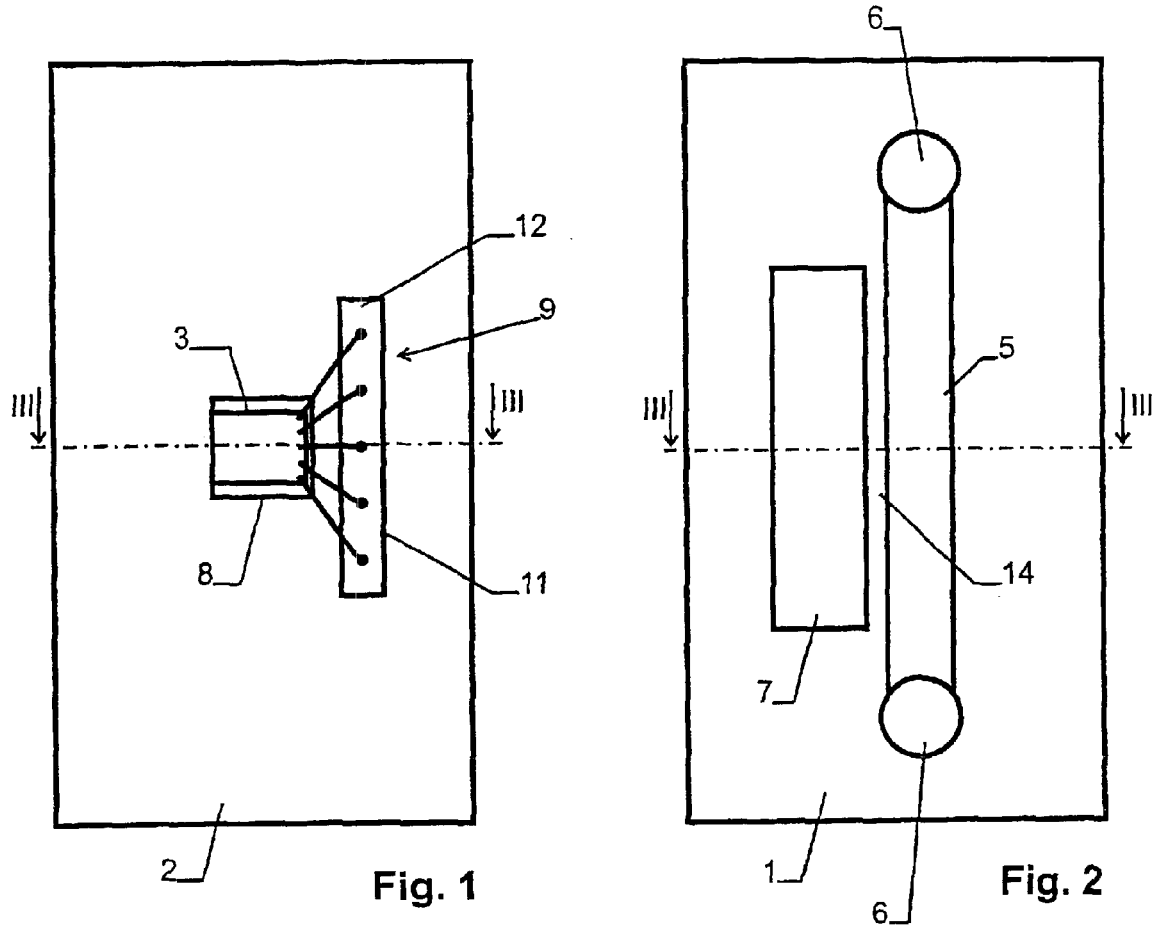
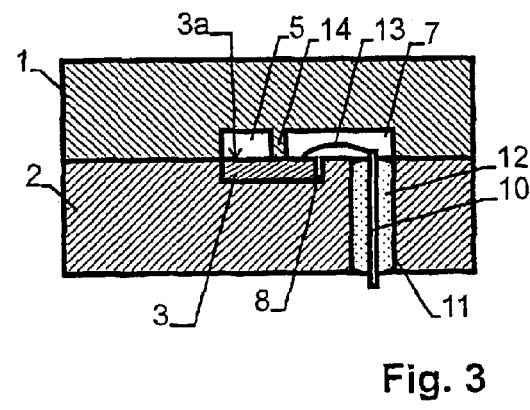

FLOW DETECTOR WITH LEAD-THROUGHS AND METHOD FOR ITS PRODUCTION

CROSS REFERENCE TO RELATED APPLICATIONS

This application claims the priority of Swiss patent application 1465/02, filed Aug. 27, 2002, the disclosure of which is incorporated herein by reference in its entirety.

BACKGROUND OF THE INVENTION

The invention relates to flow detector with at least one lead-through and to a method for manufacturing such a flow detector.

U.S. 2002/0043710 A1 describes a flow detector having a two part housing and a semiconductor chip with integrated flow sensor arranged within the housing. The semiconductor chip is arranged in a cavity of the housing. A thin, flexible foil carrying strip conductors extends between the housing parts to the outside for connecting the semiconductor chip to exterior circuitry. The presence of the foil, however, makes it difficult to seal the cavity tightly and can lead to leaks, which can be detrimental for some applications.

BRIEF SUMMARY OF THE INVENTION

Hence, it is a general object of the invention to provide a flow detector of the type mentioned above that can be sealed tightly in simple manner, as well as a method for manufacturing the same.

Now, in order to implement these and still further objects of the invention, which will become more readily apparent as the description proceeds, the flow detector according to the invention comprises a housing, a cavity arranged in said housing, said cavity comprising a channel for a fluid to be measured, at least one opening extending from said cavity through said housing to an outside of said housing, a semiconductor chip arranged in said cavity, said semiconductor chip having an integrated flow sensor, at least one electric lead-through extending through said opening and connecting said semiconductor chip to the outside, and a hardened filler material arranged in said opening sealing said opening and mechanically connecting said at least one electric lead-through to said housing.

In another aspect of the invention, the flow detector comprises a housing, a channel in said housing for a fluid to be measured, a semiconductor chip arranged in said housing at said channel, said semiconductor chip having an integrated flow sensor, at least one electric lead-through extending through at least one opening in said housing and connecting said semiconductor chip to an outside of said housing, and a hardened filler material arranged in said opening sealing said at least one opening and mechanically connecting said at least one electric lead-through to said housing.

In yet another aspect, the invention relates to a method for manufacturing a flow sensor having a housing, a channel in said housing for a fluid to be measured, a semiconductor chip arranged in said housing at said channel, said semiconductor chip having an integrated flow sensor, and at least one electric lead-through extending through at least one opening in said housing and connecting said semiconductor chip to an outside of said housing, said method comprising the steps of inserting a liquid filler material into said opening and hardening said filler material for sealing said opening and mechanically connecting said at least one electric lead-through to said housing.

Hence, according to the invention, at least one opening is provided in the housing for electrically connecting the chip to external circuitry. The opening extends to the outside of the housing. One or more electrical lead-troughs and a hardened filler material are arranged in the opening. The filler material seals the opening tightly against a passage of the fluid to be measured.

For manufacturing, the lead-throughs and the filler material are introduced into the opening(s) and the filler material is hardened. This makes the manufacturing process simple.

The flow detector according to the invention can be used for measuring the flow velocity or mass flow of various fluids. Because it is well sealed, it is especially suited for the measurement of Helium or Hydrogen or for highly toxic or corrosive fluids.

BRIEF DESCRIPTION OF THE DRAWINGS

The invention will be better understood and objects other than those set forth above will become apparent when consideration is given to the following detailed description thereof. Such description makes reference to the annexed drawings, wherein:

FIG. 1 is a top view onto a first one of the housing parts of a disassembled detector, FIG. 2 is a button view onto the second housing part, and FIG. 3 is a sectional view along line III—III of FIGS. 1 and 2 of the assembled detector.

DETAILED DESCRIPTION OF THE INVENTION

The flow detector shown in the figures comprises a first housing part 1, a second housing part 2 and a semiconductor chip 3 arranged substantially between the first and the second housing part.

A straight notch 5 is formed in a surface of first housing part 1, which forms, together with adjacent second housing part 2, a channel. Two ducts 6 extend through first housing part 1. They can e.g. by formed by bores and they connect the ends of the channel to the outside.

Further, recesses 7 and 8 are provided in first housing part 1 and second housing part 2, respectively. Notch 5 and the recesses 7, 8 form a cavity inside the housing. The part of the cavity formed by notch 5 is used as a channel for receiving the fluid to be measured, which can be a gas or a liquid.

A possible design of semiconductor chip 3 is shown in U.S. 2002/0043710 A1. It has e.g. a heater arranged between two temperature sensors and may contain further components for controlling or processing the measurement. When the fluid to be measured flows through the channel, the energy from the heater is unequally distributed between the two temperature sensors, which allows to determine the flow velocity or the mass flow.

As can especially be seen from FIG. 3, semiconductor chip 3 of the present embodiment lies in recess 8 of second housing part 2. It is arranged in such a manner that the surface part 3a carrying the temperature sensors and the heater is flush with the wall of the channel.

A nose 14 extending between notch 5 and recess 7 of the first housing part touches the device surface of semiconductor chip 3 and divides the same into two parts. The first part corresponds substantially to mentioned surface part 3a, while the second part contains any further electronic components and the contact pads of semiconductor chip 3, which are separated from the channel by nose 14.

For electrically connecting semiconductor chip 3 to external circuitry, a connecting opening 11 is provided in second housing part 2, i.e. in the same housing part that also holds semiconductor chip 3. Opening 11 extends from the cavity within the housing to the outside. Metal wires or metal pins serving as electrical lead-throughs 10 extend through opening 11. The space between the lead-throughs 10 and the wall of opening 11 is filled by a hardened filler material 12. Filler material 12 mechanically connects the lead-troughs 11 to second housing part 2 and seals the cavity.

Connecting wires 13 extending as connectors through recess 7 of the first housing part are provided for electrically connecting semiconductor chip 3 to the lead-troughs 10.

For sealing the two housing parts 1, 2 a sealing ring can be provided as it is described in U.S. 2002/0043710 A1. The two housing parts 1, 2 can also be glued or welded to each other.

In the present embodiment, exactly one connecting opening 11 is provided, which receives all lead-throughs 10. It is also possible to provide a separate opening 11 for each single lead-through 10.

In the embodiment of FIGS. 1–3, semiconductor chip 3 is arranged in a recess 3 of second housing part 2. It can, however, also be placed in different manner at or in the channel, e.g. not in a recess but projecting into the channel, which may, however, encourage turbulences in the liquid.

The filler material 12 is preferably made from glass. Depending on application, however, it may also be made from an other hardening filler, such as glue and/or epoxy resin. When using a metal housing, an electrically insulating filler has to be used. Depending on the desired application, the housing parts can e.g. be made from metal, plastics or ceramics.

When manufacturing the detector, the lead-troughs 10 are held into connecting opening 11 and the liquid filler is cast in. Then, the filler is hardened. Now, semiconductor chip 3 is inserted and electrically connected to the lead-throughs 10. Finally, the two housing parts are joined.

For protecting the wires 13, recess 7, and therefore a part of the cavity within the housing, can also be filled by a hardening filler material after joining the housing parts.

While there are shown and described presently preferred embodiments of the invention, it is to be distinctly understood that the invention is not limited thereto but may be otherwise variously embodied and practised within the scope of the following claims.

What is claimed is:

1. A flow detector comprising:
   a housing,
   a cavity arranged in said housing, said cavity comprising a channel for a fluid to be measured,
   at least one opening extending from said cavity through said housing to an outside of said housing,
   a semiconductor chip arranged in said cavity, said semiconductor chip having an integrated flow sensor,
   at least one electric lead-through extending through said opening and providing a connection of said semiconductor chip to the outside, and
   a hardened filler material arranged in said opening, sealing said opening and mechanically connecting said at least one electric lead-through to said housing.

2. The flow sensor of claim 1 wherein the filler material is of at least one material selected from the group comprising glass and epoxy resin.

3. The flow sensor of claim 1 wherein the housing is of at least one material selected from the group comprising metal, ceramics and plastics.

4. The flow sensor of claim 1 wherein the at least one lead through comprises a metal pin or metal wire.

5. The flow sensor of claim 1 wherein said housing comprises at least two housing pans.

6. The flow sensor of claim 5 wherein the at least one opening extends through only one of said housing parts.

7. The flow sensor of claim 5 wherein the housing parts are glued or welded to each other.

8. The flow sensor of claim 5 comprising a recess in one of said housing parts, wherein at least one electrical connector extends through said recess between said semiconductor chip and said at least one lead-through.

9. The flow sensor of claim 5 further comprising a recess in said second housing part, wherein said semiconductor chip is arranged in said recess and wherein said at least one opening extends through said second housing part.

10. The flow sensor of claim 5 comprising a plurality of lead-throughs.

11. The flow sensor of claim 10 wherein several lead-throughs extend through one opening.

12. The flow sensor of claim 10 wherein all lead-throughs extend through the same opening.

13. The flow sensor of claim 1 wherein the filler is of a different material than the housing.

14. A flow detector comprising
   a housing,
   a channel in said housing for a fluid to be measured,
   a semiconductor chip arranged in said housing at said channel, said semiconductor chip having an integrated flow sensor,
   at least one electric lead-through extending through at least one opening in said housing for connecting said semiconductor chip to an outside of said housing, and
   a hardened filler material arranged in said opening sealing said at least one opening and mechanically connecting said at least one electric lead-through to said housing.

15. A method for manufacturing a flow sensor, the method comprising the steps of:
   providing a housing,
   forming a channel in said housing for a fluid to be measured,
   arranging a semiconductor chip in said housing at said channel, said semiconductor chip having an integrated flow sensor,
   providing at least one electric lead-through extending through at least one opening in said housing for connecting said semiconductor chip to an outside of said housing,
   inserting a liquid filler material into said opening and
   hardening said filler material for sealing said opening and mechanically connecting said at least one electric lead-through to said housing.

* * * * *